United States Patent
Roux et al.

(10) Patent No.: US 11,147,130 B2
(45) Date of Patent: Oct. 12, 2021

(54) APPLIANCE WITH MEANS TO SEPARATE ELECTRIC COILS FROM A GLASS CERAMIC WORKTOP

(71) Applicant: EUROKERA S.N.C., Chateau Thierry (FR)

(72) Inventors: Nicolas Roux, Chateau-Thierry (FR); Pablo Vilato, Paris (FR); Franck Demol, Reims (FR); Gregory Debreyer, Montcourt Fromonville (FR); Michael Ravel, Barzy sur Marne (FR); Virginie Goldenberg, Aubervilliers (FR)

(73) Assignee: EUROKERA S.N.C., Chateau Thierry (FR)

( * ) Notice: Subject to any disclaimer, the term of this patent is extended or adjusted under 35 U.S.C. 154(b) by 344 days.

(21) Appl. No.: 16/096,185

(22) PCT Filed: Apr. 24, 2017

(86) PCT No.: PCT/FR2017/050965
§ 371 (c)(1),
(2) Date: Oct. 24, 2018

(87) PCT Pub. No.: WO2017/187072
PCT Pub. Date: Nov. 2, 2017

(65) Prior Publication Data
US 2019/0141795 A1     May 9, 2019

(30) Foreign Application Priority Data

Apr. 25, 2016    (FR) ...................................... 1653645

(51) Int. Cl.
*F24C 15/08*     (2006.01)
*F24C 15/10*     (2006.01)
(Continued)

(52) U.S. Cl.
CPC ........... *H05B 6/1245* (2013.01); *A47B 13/12* (2013.01); *A47B 77/08* (2013.01); *F24C 15/103* (2013.01);
(Continued)

(58) Field of Classification Search
None
See application file for complete search history.

(56) References Cited

U.S. PATENT DOCUMENTS

| 5,611,327 A * | 3/1997 | Teixeira Filho ........ F24C 3/124 126/39 G |
| 6,255,628 B1 * | 7/2001 | Perrino ................... F24C 3/085 126/39 J |

(Continued)

FOREIGN PATENT DOCUMENTS

| EP | 0 751 354 A1 | 1/1997 |
| EP | 1 627 579 A1 | 2/2006 |

(Continued)

OTHER PUBLICATIONS

International Search Report dated Jul. 27, 2017 in PCT/FR2017/050965 filed Apr. 24, 2017.

*Primary Examiner* — Joseph M. Pelham
(74) *Attorney, Agent, or Firm* — Oblon, McClelland, Maier & Neustadt, L.L.P.

(57) ABSTRACT

A worktop or furniture unit, made up of at least one glass ceramic sheet and elements for its operation, at least one of said elements being positioned on a two-dimensional or three-dimensional mobile support coupled to a circuit breaker, so that, when the support is in a first position, said element lies facing one face of the sheet at a distance from the sheet and can be activated, and, when the support is in a second position, obtained by a movement thereof, in which position at least one of the ends of the support is moved by, or lies at, a distance with respect to the sheet and perpendicular thereto and is moved by, or lies at, a distance with respect to its first position, said element is deactivated.

19 Claims, 2 Drawing Sheets

(51) Int. Cl.
    *H05B 6/10*    (2006.01)
    *H05B 6/12*    (2006.01)
    *A47B 77/08*   (2006.01)
    *F24C 15/30*   (2006.01)
    *A47B 13/12*   (2006.01)

(52) U.S. Cl.
    CPC ........ *F24C 15/30* (2013.01); *H05B 2206/022* (2013.01); *Y02B 40/00* (2013.01)

(56) References Cited

U.S. PATENT DOCUMENTS

| | | | |
|---|---|---|---|
| 6,371,105 B1 * | 4/2002 | Merritt | F24C 15/12 |
| | | | 126/211 |
| 2007/0157920 A1 * | 7/2007 | De Miranda Grieco | |
| | | | F24C 14/005 |
| | | | 126/211 |
| 2008/0264928 A1 * | 10/2008 | Sung | H05B 3/68 |
| | | | 219/452.11 |
| 2008/0308087 A1 * | 12/2008 | Rosenzweig | F24C 15/12 |
| | | | 126/14 |

FOREIGN PATENT DOCUMENTS

| | | |
|---|---|---|
| EP | 2 469 190 A1 | 6/2012 |
| WO | WO 2008/114426 A1 | 9/2008 |

* cited by examiner

APPLIANCE WITH MEANS TO SEPARATE ELECTRIC COILS FROM A GLASS CERAMIC WORKTOP

The present invention relates to an item formed from a sheet (made) of glass ceramic, this sheet being intended in particular to act as an (in particular horizontal) worktop or surface of a furniture unit, this sheet in particular being of large dimensions (the item being for example the furniture unit thus formed), the item also comprising elements of use in its operation or in the operation of the sheet, for example heating elements, electronic components, etc.

Glass ceramic has been used in particular for several years to form glass ceramic hobs, which have been very successful with housekeeping experts, manufacturers of household electrical appliances and users alike, because of their attractive appearance and ease of cleaning.

Worktops themselves are generally made from other materials, for example wood, quartz, Corian®, etc., although the use of glass ceramic sheets from which to make these worktops, although leading to problems specific to that material, is proving particularly attractive.

A glass ceramic starts out as a glass, referred to as a precursor glass (or parent glass or green-glass), the specific chemical composition of which makes it possible, through suitable heat treatments referred to as ceramization, to bring about controlled crystallization. This partially crystallized specific structure gives the glass ceramic unique properties.

Each glass ceramic product is the result of specific studies and numerous tests, given that it is very tricky to make modifications to glass ceramics and/or to the method by which they are obtained without risking an unfavorable effect on the sought-after properties: for example in its usual duty as a hob, a glass ceramic sheet generally needs to have transmission in the visible domain that is both low enough to conceal the underlying heating elements at rest, and high enough that the user can visually detect when said elements are in operation, for safety purposes, and/or can read any displays there might be. Glass ceramic sheets must also have sufficient mechanical strength as required for their use, and especially and all the more so when they are large in size, and in particular, in the field of household electrical appliances, they must exhibit (as defined for example by standard EN 60335-2-6 for their usual duty as hobs) good ability to withstand pressure, impacts (for supporting, and tolerating the droppage of, utensils, etc.), etc.

In order to fulfil the function or functions assigned to them, the glass ceramic sheet is generally equipped with (decorative or functional) accessories or additional elements needed for its end purpose (for example with heating elements or with a control strip in the case of hobs), particularly with electronic components, said elements or accessories generally being fixed to the sheet permanently, by being set into a housing provided in the sheet for that purpose, and/or possibly by being bonded to a region distinct from the heating regions, where present. The position and choice of accessories are thus fixed in advance, and once the sheet and its accessories are assembled, if an element is defective, the entire assembly has to be dismantled using special-purpose tooling, or the repair entails is exchanging the entire sheet or assembly.

The dismantling operation is made all the more complicated since the glass ceramic sheets are heavy, particularly when of large dimensions, and are generally attached to their support with the interposition of a seal where appropriate for safety and sealing reasons. As a result, the use of glass ceramic combined with electronic components from which to make interactive and/or multifunctional worktops or surfaces of furniture units presents problems in terms of the fitting or removal of components, in particular when it is a matter of creating installations of a modifiable nature, any intervention being particularly complex and potentially entailing a full change-out in the event of a defective element.

The present invention has therefore sought to develop an item, such as a worktop or a furniture unit, formed of at least one glass ceramic sheet and of elements required for its operation (particularly electronic equipment), in particular concealed by said sheet within said item when it is in operation, this item allowing easier maintenance of those of its constituent components required for its operation which are normally concealed by said sheet in operation, without recourse to special-purpose tooling and without the need to change the sheet.

This objective has been achieved by the item according to the invention, this item in particular being a worktop or furniture unit, or another appliance for, in particular, domestic and/or furnishing use, this item being made up of at least one glass ceramic sheet and elements for its operation (the sheet for example being intended to be equipped with electronic components intended for various uses and able in particular to cover or to accept heating elements), at least one of said elements being positioned on a two-dimensional or three-dimensional mobile support (such as a plate or a casing) coupled to a safety (or protection) device, such as a circuit breaker or a contactor or a breaker switch, so that, when the support is in a first position (position of operation of the element(s)), said element (positioned on the support) lies facing one face of the sheet (particularly the lower face thereof) at a distance (perpendicular to said face and between said face and the closest end of the element) of at most 10 cm from the sheet and can be activated, and, when the support is in a second position, obtained by a movement thereof, in which position at least one of the ends (or one of the edges) of the support is moved by a distance (or lies at a distance) of at least 2 mm with respect to the sheet and perpendicular thereto (in particular vertically) and is moved by a distance (or lies at a distance) of at least 5 cm (which may or may not be perpendicular to the sheet) with respect to its first position (or position it occupies when the support is in its first position), said element is deactivated (advantageously by the action of the safety device).

For preference, several elements (or at least some of the collection of elements) of use in the operation of the sheet or of the item, or even all of the elements that allow the sheet or the item to operate, are positioned (or placed) on the mobile support in such a way that, in a first position (first and second referring to positions that are relative, not necessarily in that order, it also being possible for other intermediate or additional positions potentially to be provided) of the support (position of operation of the elements and/or of the sheet), said elements lie facing one face of the sheet (particularly the lower face thereof) at a distance (perpendicular to said face and between said face and the nearest end of each of said elements) of at most 10 cm from the sheet and can be activated, and, when the support is in a second position, obtained by a movement thereof, in which position at least one of the ends (or one of the edges) of the support is moved by, or lies at, a distance of at least 2 mm with respect to the sheet perpendicular thereto, and is moved by, or lies at, a distance of at least 5 cm with respect to its first position, at least some (or even all) of said elements are deactivated (advantageously through the action of the safety device), it being possible for certain elements, which present little danger (for example a tablet or a light source the operating voltage of which is below 12 V ac or below 30 V dc) and which are connected to electrical circuits independent of those involved with the safety device, to remain active where appropriate.

The mobile support may notably take the form of a plate or of a casing or housing (particularly one which is open), for example made from a material such as aluminum, stainless steel, glass, laminate, etc., this support preferably being situated beneath the sheet and able to occupy a surface area corresponding to all or part of that of the face of the sheet facing which it lies when the support is in the first position, the support generally being arranged parallel or approximately parallel to said face of the sheet in said first position. The support may be capable of translational and/or rotational movement, horizontally and/or vertically, so as to move it at least partially away from the sheet in the second position mentioned according to the invention, the support furthermore being coupled to a safety device, this device in particular being a circuit breaker or formed of at least one, manual or automatic, circuit breaker, triggered in particular by the movement of the plate and which may be situated, or activated, at various points in the travel of the plate, depending on the device used and the level of safety desired, so as to allow easy and safe access to the elements, which allow the sheet or the item to operate, which are positioned on the support. The safety device may also be formed, for example, by a contact switch which de-energizes when the support is moved, thus preventing normal use of the electrical system.

The support is preferably capable of rotational movement and/or movement in at least two directions, for example vertically and horizontally, so as both to move the elements vertically away from the sheet and offset (or shift) them horizontally with respect to their first position, particularly allowing them where appropriate to leave the space delimited by the sheet and under which they are located in their operating position (the first position of the support), these elements in particular still being concealed by the sheet in their operating position and thus being able to be extracted from the enclosure of the item (particularly, where appropriate, from the enclosure of the furniture unit when closed or in the compact position) and become visible and accessible when at least one of them requires intervention or replacement.

The movement of the support may for example be about an axis of rotation (for example situated along an opposite edge to the edge intended to be moved away from the sheet and via which an operator is intended to gain access to the elements situated on the support, as illustrated later, or locally about a suitable axis, in the manner, for example, of a hatch under the sheet, etc.) or on (guide) rails or slides, where appropriate shaped to allow a vertical and horizontal movement, for example rails in the approximate shape of an S, as illustrated later, or along one or more racks, etc. The support may, for example in the latter instance, take the form of a drawer or form part of a drawer or lie within a drawer, this support sliding along slides and being able to be extracted completely or partially from the furniture unit or item in which it lies, for example by pulling on handles situated on the visible external wall of the drawer, as illustrated later.

When the support is in the first position, the elements situated on the support lie facing the lower face of the sheet at a distance of at most 10 cm, and preferably of at most 4 cm, from the sheet (measured perpendicular to said face and between said face and the nearest end of each element), and, as a particular preference, at a distance of under 1 cm, advantageously less than 5 mm, it being possible for the elements to be in contact with the sheet (for example induction heaters) or a small distance, for example of at least 1 mm or a few millimeters, away therefrom, depending on the elements considered, this first position in particular allowing these elements to perform their functions; when the support is in the second position, at least one of its ends, or even the entirety of the support, is moved by, or lies at, a distance of at least 2 mm, and preferably of at least 1 cm, from the sheet perpendicular thereto (in order in particular that the movement of the support does not damage, and in particular does not scratch, the sheet), and is moved by (in one and the same movement as the movement used to move the support away from the sheet or in a simultaneous or consecutive second movement), or lies at, a distance of at least 5 cm, in particular of at least 10 cm, as a particular preference of at least 15 cm, in particular of at least 50 cm, in relation to its first position (this distance being measured between the two positions), this distance also preferably corresponding to at least 30%, or even to at least 100%, of the length or depth of the sheet, in particular so that the elements are suitably clear of the sheet and accessible. In particular, in the second position, at least one of the ends of the support, or even the entirety of the support, is moved by, or lies at, a distance of at least 10 cm from its first position vertically, for example by rotating or lowering of the support, and/or is moved by, or lies at, a distance of at least 2 mm from the sheet vertically and of at least 5 cm, in particular of at least 10 cm, as a particular preference of at least 15 cm, in particular of at least 50 cm, horizontally with respect to its first position, for example by lowering followed by translational movement of the support, the movement being performed in particular by translational or rotational movement with, particularly in the last instance, an angle of at least 2.5°, in particular of at least 10°, or of at least 20°, or even of at least 30°, particularly of at least 45°, or of at least 60°, with respect to the first position.

The safety (or protection) device is preferably formed of at least one component or apparatus that enables the supply of electricity to at least some of the elements situated on the support (such as, where appropriate, the heating elements to avoid any burns) to be cut off when the support moves from the first into the second position and/or in the event of an electrical short circuit, and for example takes the form of a mechanically-acting or electrically-acting apparatus (circuit breaker, contactor, breaker switch, etc.) integrated, at least in the case of part of said appliance or device, with the electrical system(s) to be cut off (the other or another part in particular where appropriate being situated on the support) and triggered for example by the movement of the support.

Where appropriate, the item may also comprise (or the sheet may also be coupled to) a safety device (which may or may not be independent of the aforementioned safety device) so as to prevent the operator from becoming trapped or prevent excessively sharp movement of the support as it is actuated, such as a brake or damper, or the item may comprise or the sheet may be coupled to (a safety device incorporating) one or more end stops or one or more latches or one or more devices or systems for immobilizing or locking when the support is in (at least) one of its positions of use (in particular its first position and/or second position) so as, when required, to give the support sufficient stability in this position or in each position.

The support (or the item according to the invention) may also provide other components, such as one or more handles for manipulating it, it also being possible for the item to be equipped with various elements (which may or may not be positioned on the support) as detailed hereinafter. Where appropriate, the support may also be in several parts, each of which may or may not be able to be maneuvered independently.

The item according to the invention allows easier maintenance of those of its constituent components needed for its operation which are concealed by the glass ceramic sheet that forms one of its surfaces, it being possible for this maintenance to be carried out in complete safety, without the need for tricky dismantling operations and without entailing replacing external elements such as the sheet, thus allowing a saving in time, while at the same time avoiding excessive expense should elements malfunction. In addition, the proposed solution avoids the need to manipulate and move the glass ceramic sheet which is particularly heavy, in particular when it is of large dimensions, and avoids any damage to said sheet or to the elements needed for its operation while at the same time allowing said elements to perform their function in the operating position in combination with the sheet (such as heating, illuminating heating zones or display of data by said elements).

The glass ceramic sheet advantageously occupies most (more than 50% of the surface of the face on which it is located, preferably more than 80%, in particular more than 90%) or even all of the surface area of one face, particularly the top face of the item according to the invention, offering a continuous surface capable of supporting various terms depending on the purpose for which said sheet or said item is intended. Where appropriate, it rests, generally at its periphery, on at least one casing or one or more support legs, without there being any need where appropriate to interpose a seal (or without any interposed seal) between these parts (unlike the situation in devices in which the glass ceramic sheet occupies just part of this surface area and into which it is inset). The glass ceramic sheet is also advantageously monolithic (or monoblock or made as a single piece), and essentially planar (with the exception of potential localized deformations formed in the substrate for esthetic and/or functional purposes). The sheet thus offers a surface that is predominantly continuous/uniform/free of joins, esthetic and easy to maintain. The sheet may where appropriate be provided with decorative or functional coatings of small thickness (in particular of the order of a few tens of nanometers to a few hundred microns, or even more), for example made of enamel, paint, thin layers, etc., as specified later, or may potentially be decorated by sandblasting or etching, etc.

When the item is a furniture unit or a worktop, the glass ceramic sheet may in particular have a surface area (length times weight of its face of largest dimensions) greater than or equal to 0.7 m$^2$, preferably greater than 0.9 m$^2$, in particular greater than 1 m$^2$, or even greater than 2 m$^2$. For preference in this case it also has one and/or other of the following characteristics (the limits given being included): Young's modulus of between 80 and 100 GPa (measured according to the ASTM C 1259 standard), flexural strength of between 110 and 220 MPa (measured by a ring-on-tripod test, on a 70 mm×70 mm×4 mm plate, the sample resting on three 9.5-mm diameter balls positioned at the vertex of an equilateral triangle inscribed in a 40-mm diameter circle, a force being applied to the center of the sample by a 10-mm diameter ring with an advance of 5 mm/min, the results being interpreted with the Weibull model described in: "A statistical distribution of strength of Materials", Royal Swedish Institute For Engineering Research, W. Weibull, Stockholm 1939, 1-45, the data obtained, also referred to as a "scale factor", revealing the average rupture stress resulting from the analysis by the Weibull method of the flexural modulus of rupture (MOR) measurements, being expressed in MPa), thermal conductivity of less than 2 W/m·K (measured according to the DIN 51936 standard), resistance to thermal shocks of between 250° C. and 700° C., density of between 2.3 and 2.7, resistance to acids of between 0 and 2 mg/cm$^2$ (measured according to the DIN12116 standard), and resistance to bases of between 0 and 1 mg/cm$^2$ (measured according to the ISO 695 standard).

The glass ceramic sheet according to the invention is advantageously flat (or predominantly or virtually flat) and in particular has a flatness (height between the highest point and the lowest point of the substrate, with respect to the mean plane of the substrate, excluding any possible deliberate deformations produced on the substrate for esthetic or functional purposes) of less than 0.1% of the diagonal of the substrate, and preferably of less than 3 mm, in particular of less than 2 mm and in particular of less than 1 mm, or even of about zero, depending on the size/surface area/diagonal of the substrate, the flatness being measured using a SurFlat waviness meter sold by Visuol. The sheet is generally of geometric shape, in particular rectangular, indeed even square, indeed even circular or oval, and the like, and generally exhibits an "upper" face (face which is visible) in the position of use, another "lower" face (generally hidden, in the framework or casing of the piece of furniture incorporating said sheet) in the position of use, and an edge face (or edge or thickness). The upper face is generally flat and smooth but may also exhibit at least one protruding zone and/or at least one recessed zone and/or at least one opening and/or beveled edges, etc., these variations in shape advantageously constituting continuous variations in the sheet (with no change in materials or joins). The lower face can in particular be smooth or provided with studs increasing its mechanical strength and obtained, for example, by rolling.

The thickness of the glass ceramic sheet is generally at least 2 mm, in particular at least 2.5 mm, and is generally less than 30 mm, in particular less than 15 mm, particularly of the order of 3 to 15 mm.

The glass ceramic has a zero or virtually zero coefficient of expansion, particularly one less than $30 \times 10^{-7}$ K$^{-1}$ between 20 and 400° C., and preferably less than $13 \times 10^{-7}$ K$^{-1}$ between 20 and 400° C., and is in particular a lithium aluminosilicate glass ceramic. In particular it may be in a dark color (black, dark brown) or a pale color (white, cream) and may be translucent or opaque or transparent depending on the desired use and the desired look. It may be refined with arsenic (that is to say, have (a parent glass with) a composition comprising of the order of 0.5% to 1.5% by weight of arsenic oxide (expressed as $As_2O_3$)) or may not be refined with arsenic (in particular having a content of arsenic oxides of less than 0.2%, in particular of less than 0.1%, or even zero) or refined with tin or refined with sulfide(s), and may be obtained by rolling or by the float process.

In most cases and for preference according to the invention, the sheet used to form the item according to the invention is monolithic and has at once: a thickness of less than 15 mm; an expansion coefficient of less than $30 \times 10^{-7}$ K$^{-1}$ between 20° C. and 400° C.; and a surface area of greater than or equal to 0.7 m$^2$.

The item according to the invention is also formed of elements required for its operation, more particularly required for the operation of the aforementioned glass ceramic sheet. These elements may for example be one or more heating elements (for example induction coils), one or more display systems, one or more electronic boards, one or more light sources, one or more control units or interfaces, one or more sensors, one or more chargers (for example induction coil, telephone chargers, etc.), particularly wireless chargers, one or more leads, one or more audible or vibrating components (indicating the approach of an object of saucepan type), etc.

For example, the sheet may be equipped with one or more light sources, in particularly formed by light-emitting diodes and intended for example to embody (render visible) one or more regions or one or more elements or displays of the sheet, in particular by transmission of light through the sheet. These sources may in particular also make it possible to display controls (in the form of keys, logos, or even keypads, etc.,) which can for example be activated by contact on the surface of the sheet (using, for example, sensors located under the surface and which may likewise be attached using the connectors) or remotely (in particular by wireless communication), indeed even by simple movement of the hand (by sensors located, if appropriate, on the outside and which record the movement, for example by triangulation, in order to convert it, in particular using a suitable algorithm and a suitable interface, into the activation of a function, for example), or, if appropriate, by placing a predetermined object at a predetermined location on the sheet. The light source(s) may also make it possible to display decorations or various data (to display, for example, computer pages, cooking recipes, etc.,) downloaded, for example, by wireless communication using an appropriate interface and projected or transmitted from the light sources onto the surface of the sheet.

The sheet may also be equipped with one or more heating elements, such as induction coils, radiant elements, which also can be actuated in various ways as described for the light sources, and may also be equipped with communication interfaces with at least one adjacent element (for example light sources or heating elements) and/or if appropriate with at least one external element, for example with an external module for wireless communication, said interface(s) being for example a control unit, a tablet or a touch-screen, a system of the Bluetooth, WLAN, wifi, RFID chip, Lifi, etc. type.

The sheet may also be equipped with other elements, such as one or more waveguides, and with various other components, particularly electrical and/or electronic components as mentioned hereinabove, such as a charger (for example for a telephone, induction coil, etc.), one or more leads, an audible or vibrating component, etc.

The sheet may also comprise various functional and/or decorative coatings, in particular from among those generally used with glass ceramics, for example coatings based on enamel, on paint, on thin (for example metal, dielectric, etc.) layer(s), etc. For example, one of the faces may comprise one or more enamel layers or one or more enamel patterns having a decorative purpose and/or in order to signal one or more elements (displays, etc.) and/or acting as masking (for example to prevent light sources from being seen directly) and/or for other functions (as light extractor or to render illumination uniform, etc.). The sheet may also be provided with one or more functional layers giving it one or more additional properties, such as scratch resistance, mechanical strength, non-marking, overspill prevention, etc., it being possible in particular for the coating or coatings to be on the visible face or on the opposite face, depending on the type of coating and the desired function.

The present invention relates in particular, by way of item, to a table or worktop or furniture unit comprising a surface or plate, particularly of large dimensions, formed by the glass ceramic sheet and able to allow simultaneous or successive performance of various activities and/or supporting of objects. This furniture unit may for example be a central island in a room, such as a kitchen island, or any work table or worktop for various uses, for example a lab table, a table or a coffee table, alternatively a unit of the side-table, credenza type, an item of storage furniture, a counter top, etc.

The item according to the invention is in particular manufactured from the glass ceramic sheet, particularly of large dimensions, obtained by ceramization, by placing it and fixing it, for example by bonding (double-sided tape, silicone, magnetic strip, etc.), where appropriate on a casing or support legs, and associating with it, either beforehand or while it is being fitted, the mobile support and the elements necessary for its operation, which are positioned (at least in the case of some of them) on the mobile support.

For the record, glass ceramic sheets are generally manufactured as follows: glass with the composition chosen for forming the glass ceramic is melted in a melting furnace, the molten glass is then rolled to give a standard ribbon or sheet by passing the molten glass between forming rollers, and the glass ribbon is cut to the desired dimensions. The plates, already or not yet cut up, are subsequently ceramized in a way known per se, the ceramization consisting in baking the plates according to the temperature profile chosen in order to convert the glass into the polycrystalline material referred to as "glass ceramic", the expansion coefficient of which is zero or virtually zero and which withstands a thermal shock which can range up to 700° C. The ceramization generally comprises a stage of gradual rise in the temperature up to the nucleation range, generally located in the vicinity of the range for transformation of the glass; a stage, lasting several minutes, of passing through the nucleation range; a new gradual rise in the temperature up to the temperature of the ceramization stationary phase; the maintenance of the temperature of the ceramization stationary phase for several minutes; and then a rapid cooling down to ambient temperature.

In order to obtain large-sized sheets according to the invention, particularly sheets with a surface area greater than 0.7 m$^2$, the speed of passage during the ceramization cycle is preferentially reduced by at least 25%, preferably by at least 50%, or the length of the ceramization lehr or the residence time in said lehr is increased by at least 25%, preferably by at least 50% with respect to the speed, length or residence time respectively that are optimal or common practice for obtaining a glass ceramic substrate that has a surface area smaller than 0.4 m$^2$.

If appropriate, the process also comprises a cutting operation (generally before ceramization), for example with a water jet, mechanical scoring with a cutting wheel, etc., followed by a shaping operation (grinding, beveling, etc.). The process can also comprise a step of rolling or sag bending in order to form specific protrusions.

Other advantageous features and details of the invention will emerge below from the description of nonlimiting embodiments of the invention, with reference to the appended drawings, in which.

The same references are used throughout the figures to denote the same types of element, not all of the elements being drawn to the same scale in order to make the figures easier to understand.

Figure 1:
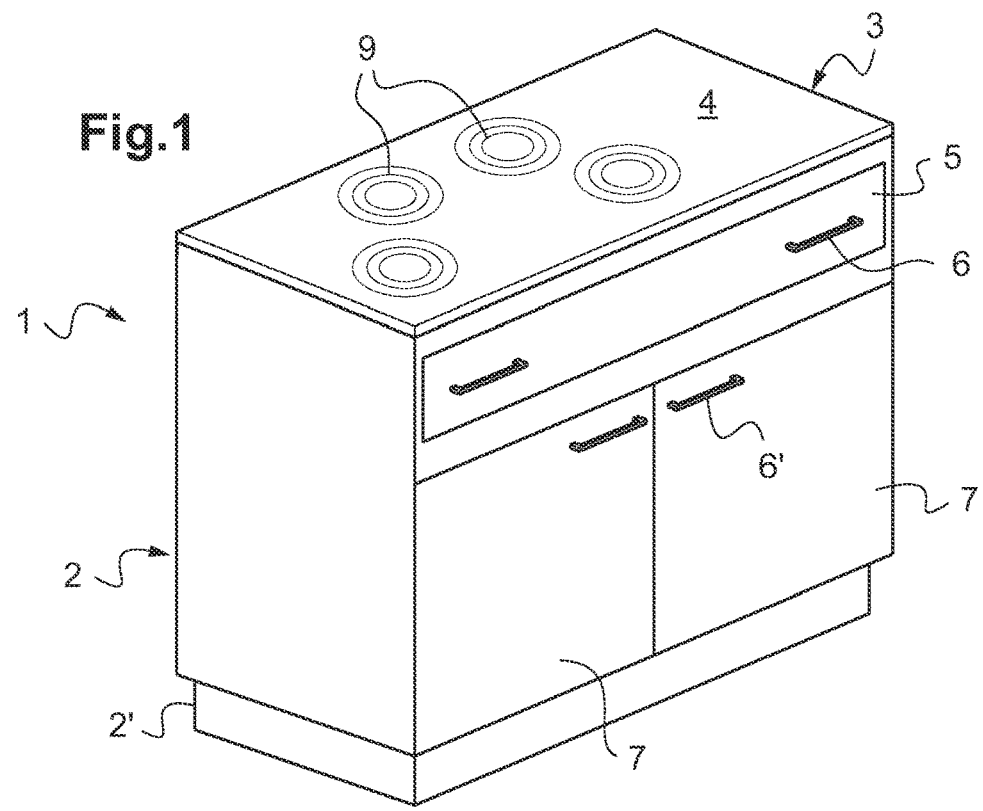
FIG. 1 depicts a schematic perspective view of an item according to a first embodiment of the invention in a first position in which the elements allowing its operation are concealed and can be activated.
Figure 2:
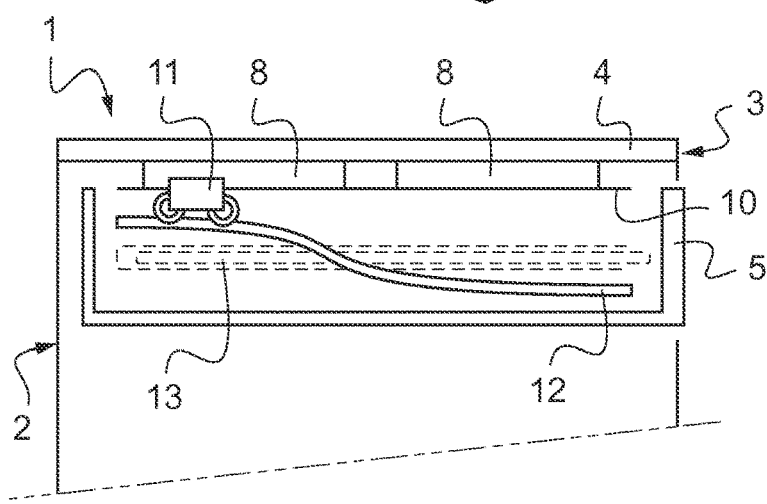
FIG. 2 depicts a partial schematic side view (the side panel of the furniture unit and that of the drawer having been removed from this side) of the item of FIG. 1 when the support bearing the elements is in the first position.
Figure 3:
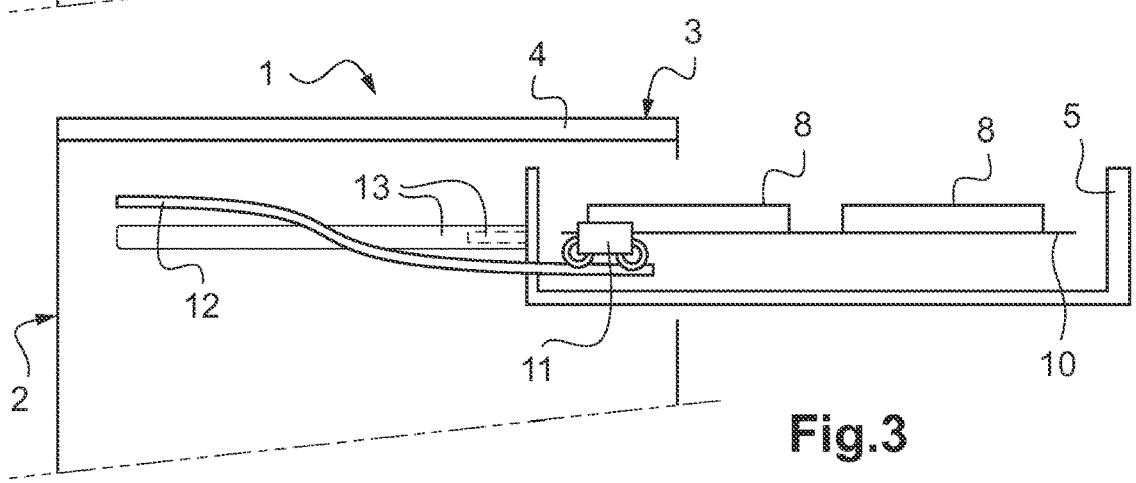
FIG. 3 depicts a partial schematic side view similar to that of FIG. 2, except that this time the support is in its second position in which the elements are accessible and deactivated.

In FIGS. 1 to 3, the item according to the invention is a furniture unit (1), for example a kitchen island unit, intended for various (successive or simultaneous) uses including the preparation and consumption of meals, the supporting of objects, the cooking of food, etc., this unit being made up of a casing (2) measuring 240 cm (length)×120 cm (depth)×95 cm (height, casing plinths (2') included) surmounted by a worktop (3) formed entirely (which means to say that the entire surface of which is formed) of a glass ceramic monolithic substrate (4) with a surface area of 2.88 m². This substrate is, for example, a sheet of the kind marketed by the Eurokera company under the reference KeraBlack+, this sheet having a smooth upper face and a studded lower face, and a thickness of 6 mm. This substrate is, for example, obtained using a procedure like that of patent application WO 2012156444, but reducing the speed of passage through the ceramization lehr by 50%, the glass ceramic substrate obtained exhibits a flatness of less than 2 mm.

The item also comprises a drawer (5) measuring 238 cm (length)×100 cm (depth)×5 cm (height), fitted with handles (6), and doors (7) likewise fitted with handles (6'), as well as elements (8) for operation, where appropriate, of the sheet, these elements in particular in this instance being heating elements for the cooking of food, for example induction elements, positioned underneath the sheet. The siting of the heating elements may where appropriate be indicated by decorations (9), for example in enamel, at the surface of the sheet, if need be delineating the heating zones (in FIG. 1, four heating zones are thus depicted).

The heating elements are positioned on a support (10) in the form of a plate mounted, for example via a system of runners and/or carriage and/or rollers and/or shoes (11), on an S-shaped guide rail (12) placed inside the drawer (in particular on each of the facing side walls), the drawer itself being mounted on one or more slides (13), for example of the telescopic type and situated along each of the lateral edges of the drawer.

When the drawer is actuated, the support, on which the heating elements and, where appropriate, other elements for the operation of the sheet or of the item are situated, moves along the rail (12) and passes from a first position (FIG. 2) in which the elements lie facing the lower face of the sheet and, in the case of at least some of them (for example the heating elements), against said sheet/at a zero distance away from said sheet, or, where appropriate in the case of others (for example a touch pad or a charger), at at least 1 mm and under 10 cm from said sheet (this distance being measured perpendicular to said face and between said face and the nearest end of the relevant element) and can be activated, into a second position of the support (FIG. 3), in which position the entirety of the support is moved both horizontally over a distance of at least 50 cm and vertically over a distance of at least 2 mm, preferably at least 1 cm, with respect to the sheet, and the elements (8) are deactivated and accessible, the elements having been deactivated during the movement of the plate by a safety device (not depicted but situated for example in the rear of the drawer or of the support), for example through the action of a circuit breaker and/or by the de-energizing of a contactor.

When the drawer is pushed back in, the support in the lowered position gradually returns to the high position inside the unit and then, when the drawer comes into abutment in its initial position, a locking system (not depicted) can immobilize the assembly in its operating position and the contactor, for example, can once again allow the elements on the plate to operate by supplying electrical current, said contactor being activated only once the front of the drawer has come into contact with the unit (or the support is in its first position).

Figure 4:
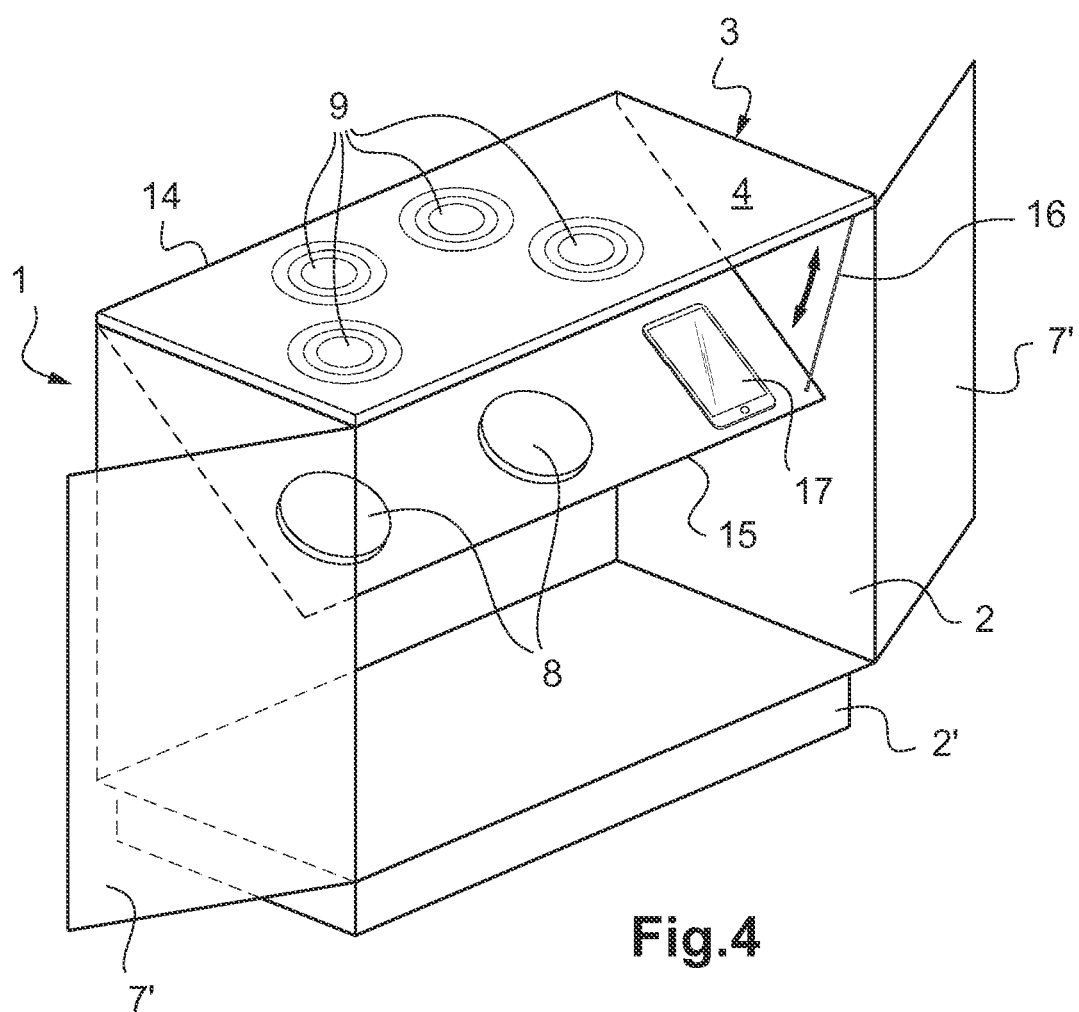
FIG. 4 depicts a schematic perspective view of an item according to a second embodiment of the invention, with the support in a position in which the elements allowing the item to operate are accessible and (at least in the case of some of them) deactivated.

In the embodiment depicted in FIG. 4, the unit (1) is also formed as before of a casing (2) similar to that of the preceding figures, likewise surmounted by a worktop (3) formed entirely of a glass ceramic monolithic substrate (4) as before, and equipped with heating elements (8) such as induction elements, positioned under the sheet, for the cooking of food, the siting of the heating elements being indicated by decorations (9) on the top face of the sheet, the unit this time being provided with two doors (7') and with a support, bearing at least the aforementioned heating elements, but is mobile, this time in rotation, for example about its opposite edge (14) to the edge (15) intended to be moved away from the sheet and via which an operator is intended to gain access to the elements situated on the support (as depicted), or locally about a suitable axis, in the manner for example of a hatch under the sheet.

The support can be immmobilized in its first position, in which the elements on the support lie facing the lower face of the sheet and, in the case of at least some of them (for example the heating elements), against said sheet/at a zero distance from said sheet, or, where appropriate in the case of others (for example a touchpad (17) or charger), at at least 1 mm and under 10 cm from said sheet, by (a) latch(es) (or locking system(s)) keeping said support against the sheet. By opening the doors of the unit and removing the latch(es), the support then reverts (as indicated by the arrow) downward and passes into a second position (illustrated in FIG. 4) in which the end (15) of the support is moved (essentially vertically) over a distance of 20 cm (and with an angle of rotation of 20°), and the elements (8) are deactivated and accessible, these elements being, for example, deactivated during the unlocking and movement of the support through the de-energizing of a contactor (not depicted). Where appropriate, the support may also be provided with a stay (16) (additional safety system), which if need be allows the support to be kept in its second position.

The support may also comprise other elements, such as a touchscreen or tablet (17), it being possible for these elements also to be deactivated, or not to be deactivated, when the support pivots.

The units depicted in the above figures may be used for various purposes, such as writing, supporting objects, use as a kitchen table (in particular allowing eating or the setting-down of cooking vessels, possibly hot, etc.), etc. Where appropriate, the casing may also be replaced by support legs (the equipment underneath the worktop being able to be concealed by localized boxing-in a few centimeters thick under the sheet) to look like a table.

The equipment according to the invention may in particular be used to advantage to create a novel range of multipurpose furniture units which are easier to repair despite, where applicable, the size and weight of some of their components.

The invention claimed is:

1. An item for domestic and/or furnishing use, made up of at least one glass ceramic sheet and elements for its operation, at least one of said elements being positioned on a two-dimensional or three-dimensional mobile support coupled to a safely device, so that, when the support is in a first position, said element lies facing one face of the sheet at a distance of at most 10 cm from the sheet and can be activated, and, when the support is in a second position, obtained by a movement thereof, in which position at least one end of the support is moved by, or lies at, a distance of at least 2 mm with respect to the sheet and perpendicular thereto and is moved by, or lies at, a distance of at least 5 cm with respect to its first position, said element is deactivated.

2. The item as claimed in claim 1, wherein at least some of the elements, or even all the elements, of use in the operation of the sheet or of the item are positioned on the mobile support, said elements lying facing one face of the sheet, at a distance, perpendicular to said face and between said face and the nearest end of each of said elements, of at most 10 cm from the sheet when the support is in said first position, and in that at least some of said elements are deactivated when the support is in said second position, advantageously through the action of the safety device.

3. The item as claimed in claim 1, wherein the mobile support takes the form of a plate or of a casing or housing, preferably situated beneath the sheet, the support being capable of translational and/or rotational movement, horizontally and/or vertically, so as to move it at least partially away from the sheet in the second position.

4. The item as claimed in claim 1, wherein, when the support is in the first position, the element(s) situated on the support lie facing the lower face of the sheet at a distance of at most 4 cm, from the sheet and, when the support is in the second position, at least one of the ends of the support, or even the entirety of the support, lies at a distance of at least 5 cm in relation to its first position, in particular lies vertically at a distance of at least 10 cm from its first position, and/or lies vertically at a distance of at least 2 mm from the sheet and horizontally at a distance of at least 5 cm from its first position.

5. The item as claimed in claim 1, wherein the safety device is formed of at least one manual or automatic circuit breaker, triggered in particular by the movement of the plate and/or by a short circuit and/or of a contactor and/or of a breaker switch.

6. The item as claimed in claim 1, wherein the movement of the support is about an axis of rotation, situated, for example, along an opposite edge to the edge intended to be moved away from the sheet, with an angle of at least 2.5° with respect to the first position of the support, or along guide rails or slides, where appropriate allowing a movement that is vertical and horizontal, for example approximately S-shaped.

7. The item as claimed in claim 1, wherein the item it comprises, or in that the sheet is coupled to, a safety device, such as a brake, to prevent the operator from becoming trapped or prevent excessively sharp movement of the support as it is actuated, or such as one or more end stops or one or more latches or one or more devices for immobilizing the support in at least one of its positions of use.

8. The item as claimed in claim 1, wherein the glass ceramic sheet occupies more than 50% of the surface area of one face of said item, said sheet in particular resting on at least one casing or one or more support legs, without a seal in between.

9. The item as claimed in claim 1, wherein the sheet is a monolithic sheet having a thickness of less than 15 mm an expansion coefficient of less than 30×10-7 K-1 between 20° C. and 400° C, and a surface area of greater than or equal to 0.7 m2.

10. The item as claimed in claim 1, wherein the item is a table or a worktop or a furniture unit.

11. The item as claimed in claim 1, wherein the item is a worktop or furniture unit.

12. The item as claimed in claim 1, wherein, when the support is in the first position, the element(s) situated on the support lie facing the lower face of the sheet at a distance of under 1 cm from the sheet and, when the support is in the second position, at least one of the ends of the support, or even the entirety of the support, lies at a distance of at least 10 cm.

13. The item as claimed in claim 1, wherein, when the support is in the first position, the element(s) situated on the support lie facing the lower face of the sheet at a distance of less than 5 mm from the sheet and, when the support is in the second position, at least one of the ends of the support, or even the entirety of the support, lies at a distance of at least 15 cm.

14. The item as claimed in claim 1, wherein, when the support is in the second position, at least one of the ends of the support, or even the entirety of the support, lies at a distance of at least 50 cm.

15. The item as claimed in claim 1, wherein the movement of the support is about an axis of rotation, situated along an opposite edge to the edge intended to be moved away from the sheet, with an angle of at least at least 10° with respect to the first position of the support, or along guide rails or slides, where appropriate allowing a movement that is vertical and horizontal, for example approximately S-shaped.

16. The item as claimed in claim 1, wherein the movement of the support is about an axis of rotation, situated along an opposite edge to the edge intended to be moved away from the sheet, with an angle of at least at least 30° with respect to the first position of the support, or along guide rails or slides, Where appropriate :allowing a movement that is vertical and horizontal, for example approximately S-shaped.

17. The item as claimed in claim 1, wherein the movement of the support is about an axis of rotation, situated along an opposite edge to the edge intended to be moved away from the sheet, with an angle of at least at least 60°, with respect to the first position of the support, or along guide rails or slides, where appropriate allowing a movement that is vertical and horizontal, for example approximately S-shaped.

18. The item as claimed in claim 1, wherein the glass ceramic sheet occupies more than 80% of the surface area of one face of said item, said sheet in particular resting on at least one casing or one or more support legs, without a seal in. between.

19. The item as claimed in claim 1, wherein the glass ceramic sheet occupies more than 90% of the surface area of one face of said item, said sheet in particular resting on at least one casing or one or more support legs, without a seal in between.

* * * * *